Figure 8:
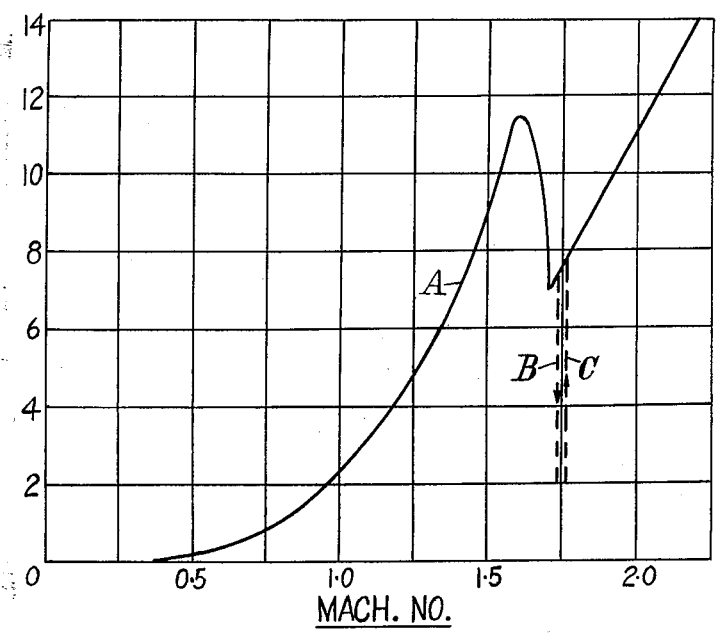

Dec. 11, 1962  D. G. GOODALL ET AL  3,067,578
AIR INTAKES FOR SUPERSONIC AIRCRAFT
Filed March 3, 1961  4 Sheets-Sheet 1
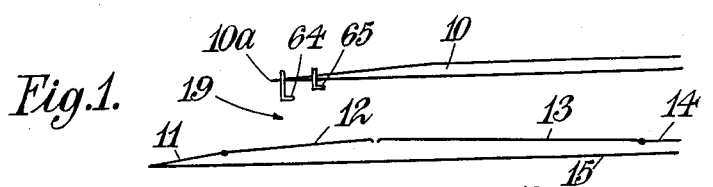
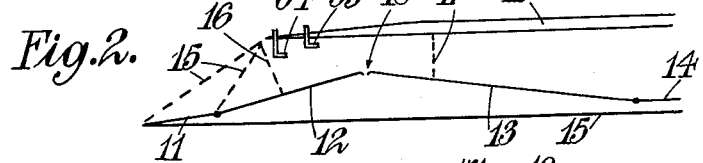
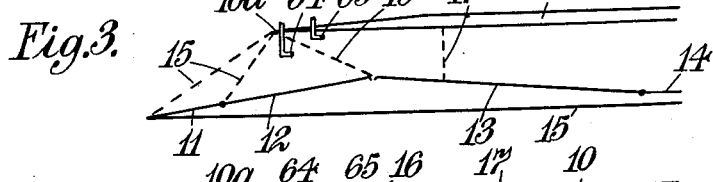
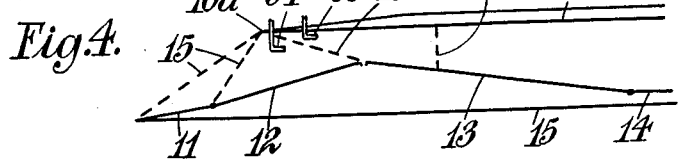
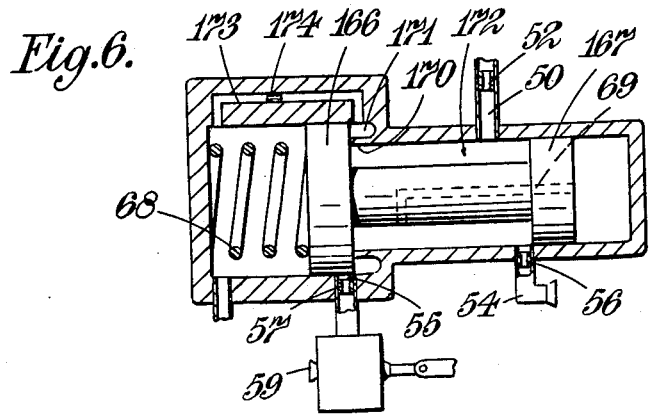

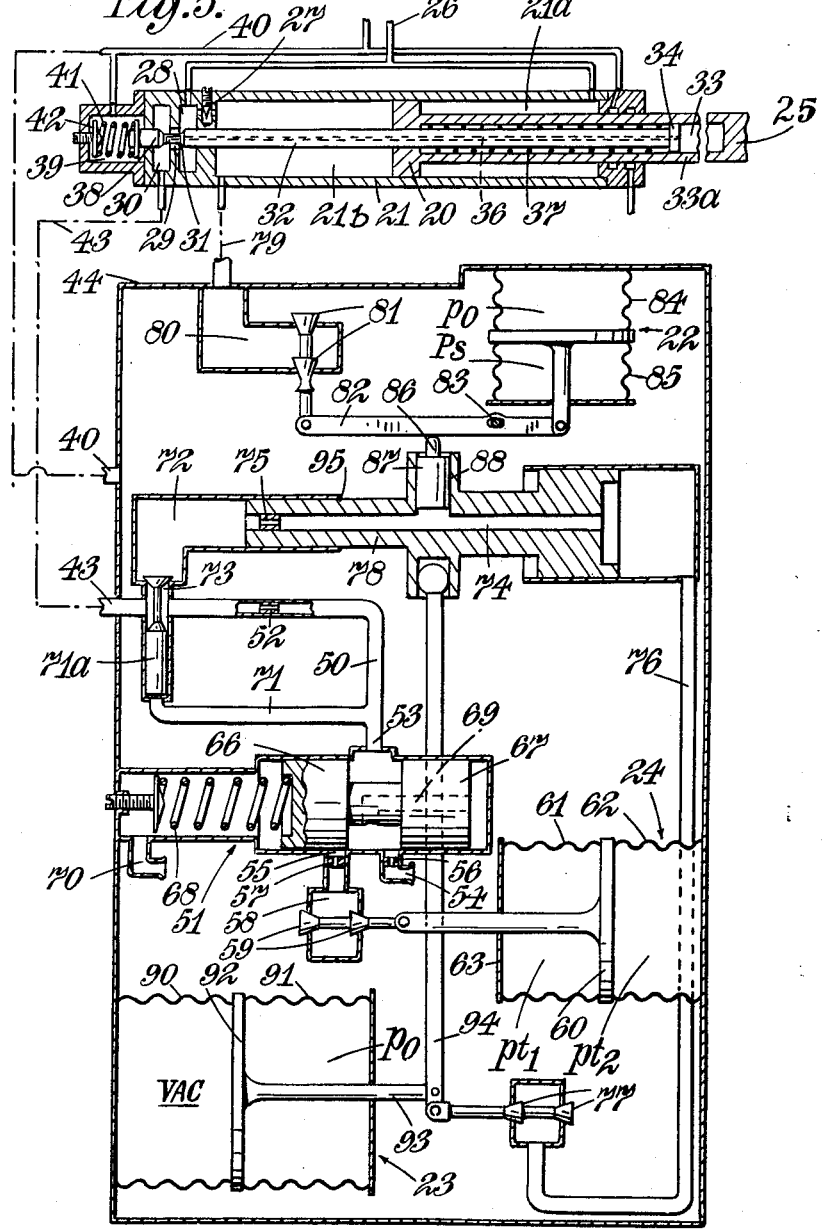

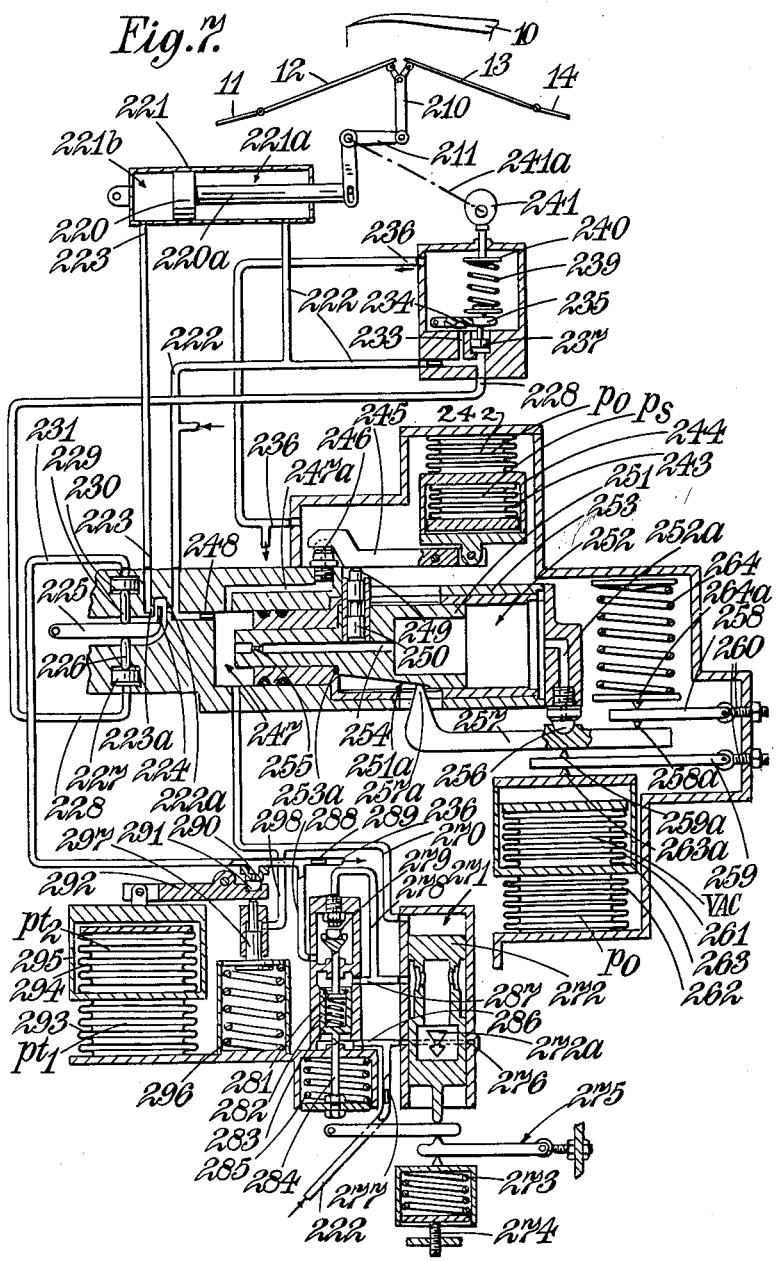

United States Patent Office 3,067,578
Patented Dec. 11, 1962

3,067,578
AIR INTAKES FOR SUPERSONIC AIRCRAFT
Donald George Goodall, Hucknall, Norman George Hatton, Mapperley, and Norman Roberts, Hucknall, England, assignors to Rolls-Royce Limited, Derby, England, a British company
Filed Mar. 3, 1961, Ser. No. 93,151
Claims priority, application Great Britain Mar. 7, 1960
21 Claims. (Cl. 60—35.6)

This invention comprises improvements in or relating to air intakes for supersonic aircraft, and more specifically is concerned with internal compression air intakes, that is intakes in which shock wave compression occurs both externally of and internally of the air intake passage. An internal compression intake may for instance have a single passage defined between first and second walls, the first wall having at its upstream end an intake lip and the second wall extending upstream and downstream of the lip and being of such geometrical form to define an intake throat downstream of the lip; in another form, the intake may have two passages defined between a pair of first, or outer, walls, each with a lip and a centre body with walls which extend upstream and downstream of the lips, which divide the space between the outer walls into two passages and which have a geometrical form to co-operate with the outer walls to define a throat in each passage downstream of the lip.

According to the invention, an internal compression air intake has the wall or walls which extend upstream and downstream of the lip, adjustable towards and away from the first wall or walls to vary the effective area of the throat or throats and control means to control adjustment of the throat area, which control means is operative at a selected Mach No. in supersonic flight to cause a temporary increase in the throat area to "start" the intake and thereafter to decrease the throat area.

As the speed of the aircraft increases towards the selected Mach No., a pattern of shock waves develops which includes both external and internal shock waves, the external shock waves tending to focus at the lip and the internal shock waves including a first internal shock wave which extends from the region of the lip into the intake passage. However, when the selected Mach No. is reached, even though the throat area is at a value appropriate for efficient operation of the intake, efficient operation is not necessarily obtained since the external shock waves do not attach themselves to the lip and the first internal shock waves does not extend from the lip to the throat, but rather these shock waves meet slightly ahead of the lip and the first internal shock wave strikes the adjustable wall upstream of the throat. With the arrangement of the invention, when this condition is reached, the throat area is temporarily increased which increase causes the external shock waves to attach themselves to the lip and also causes the first internal shock wave to take up a position in which it extends from the lip to the throat, so producing a shock wave pattern appropriate to efficient operation and thereafter the throat area is reduced to the value appropriate for efficient operation. The intake is thus "started."

Preferably, the control means includes an air-speed meter operative to control the adjustment of the wall or walls to determine the throat area at least as the selected Mach No. is approached, and a starting control sensitive to the shock wave pattern in the region of the lip and operative, when the selected Mach No. is reached, to override the air speed meter and to cause the starting adjustment of the adjustable wall or walls.

In one particular arrangement, the adjustable wall includes a pair of oppositely inclined pivoted ramps which are adjustable to vary the throat area, and the control means includes a ram connected to move the ramps, the ram operation being controlled by the air-speed meter to have a unique setting for each Mach No. in a range of Mach Nos, and by the starting control when the selected Mach No. is reached. The ram may have associated with it means arranged to produce a feed-back pressure representative of its position and thus of the throat area, which pressure is used to load a valve, which controls the balance of loads acting in the ram, in opposition to a pressure determined by the air-speed meter so that for each value of the air speed there is a corresponding feed-back pressure at which the loads acting in the ram are balanced, and the starting control is operative to vary one of these pressures in a manner to cause the desired starting adjustment of the ramps.

According to a feature of this invention, the starting control may include means responsive to air speed to render the starting control operative at the selected Mach No. and to render the starting control inoperative at air speed values below the selected Mach No.

According to a feature of this invention, the control means preferably includes an altitude compensator to render the control means inoperative below a selected altitude of flight and to adjust the control means above the selected altitude to compensate for variations in altitude. For instance, in an arrangement as above set forth, the altitude compensator may be arranged to cause full retraction of the ramps below the selected altitude and to vary the effect of the air-speed meter on the ram position as the altitude of flight varies above the selected altitude.

Some embodiments of this invention will now be described by way of example with reference to the accompanying drawings, in which—

FIGURES 1 to 4 illustrate diagrammatically the configuration of a supersonic air intake under different flight conditions, FIGURE 5 illustrates a form of "starting" control, FIGURE 6 illustrates a modification of a part of the starting control, FIGURE 7 illustrates another form of "starting" control, and FIGURE 8 is a graph illustrating a mode of operation of the control of FIGURE 7.

Referring to FIGURES 1 to 4, the supersonic intake illustrated is of the single passage kind and comprises a fixed outer wall 10 having a lip 10a at its upstream end, and a co-operating wall structure which comprises a fixed apex portion 11 ahead of the lip 10a, an adjustable upstream ramp 12 pivoted by its upstream edge to the apex portion 11 and extending downstream beyond the lip 10a, an adjustable downstream ramp 13 extending downstream from the upstream ramp 12, a fixed wall 14 to which the ramp 13 is pivoted by its downstream edge. The intake may for instance be at the surface 15 of an aircraft fuselage or wing.

The ramps 12, 13 are coupled together for simultaneous adjustment towards and away from the outer wall 10.

The intake is designed for operation at supersonic flight speeds and is also designed for internal compression, that is in supersonic flight the shock wave pattern created includes shock waves within the air intake passage 19.

FIGURES 1 to 4 illustrate a typical mode of adjustment of the ramps 12, 13 with a control of this invention. In FIGURE 1, the intake is set for subsonic flight, the ramps 12, 13 being retracted fully away from the outer wall 10. As the aircraft speed increases through and above Mach 1, the ramps 12, 13 are adjusted towards the wall 10 and a shock wave pattern develops which at a predetermined Mach No. comprises external shock waves 15 which are focussed towards the lip 10a and internal shock waves 16, 17, the upstream internal shock wave 16 extending from the region of the lip 10a towards the ramp 12. The shock wave formation of FIGURE 2 is undesirable in that the shock waves 15 have not attached themselves to the lip 10a and in that the internal shock wave 16 does not extend between the lip 10a and the junction of the ramps 12, 13 which is at the throat 18 of the intake and this causes the intake to be inefficient. The control of this invention is arranged to operate when the conditions of FIGURE 2 are reached, automatically to increase the effective throat area of the intake by retracting the ramps 12, 13 to cause the intake to "start," that is the shock waves 15, 16 take up a configuration as shown in FIGURE 3 in which they are attached to the lip 10a and in which shock wave 16 extends from the lip 10a to contact the ramps 12, 13 at the position of the intake throat 18. When the desired configuration of shock waves is achieved, the control automatically reduces the effective throat area by moving the ramps 12, 13 towards the wall 10 (FIGURE 4) to a value dependent on the instantaneous free stream Mach No. The desired shock wave configuration 15, 16, 17 however remains.

One form of control for achieving the above and other effects is shown in FIGURE 5.

The control comprises a ram having a differential area piston 20 working in a cylinder 21, the position of the piston 20 being controlled primarily by an air speed meter 22, the effect of which is varied by an altitude compensator 23 in accordance with altitude above a selected value of altitude, say 35,000 feet, and also being controlled for "starting" purposes by a starting control 24.

The ram piston rod 25 is connected to the ramps 12, 13 to move them, and, with a control as shown in FIGURE 5, movement to the right of the piston 20 moves the ramps towards the wall 10 thus reducing the effective throat area, and movement to the left increases the effective throat area.

The ram cylinder 21 is divided by piston 20 into two pressure spaces 21a, 21b of which the smaller effective area space 21a is connected to a high pressure liquid supply pipe 26, and of which space 21b on the larger area side of the piston 20 is connected through a restrictor 27 to a chamber 28 which is connected to the pipe 26.

The chamber 28 has an outlet 29 to a further chamber 30, and the outlet 29 is controlled by a valve 31 formed with a stem 32 projecting through space 21b into a bore 33 in the piston 20 and its rod 33a, the stem 32 having a piston head 34. The part of bore 33 to the right of the head 34 is connected by a drilling 36 to the chamber 30. The stem 32 carries a spring 37 having abutments on the piston 20 and the head 34. The valve 31 has an extension projecting through outlet 29 to a guide member 38 slidable in a wall dividing the chamber 30 from a low pressure chamber 39 which is connected to a low pressure pipe 40 and houses a setting spring 41 acting on the guide member 38 and having an adjustable abutment 42.

The chamber 30 has a vent pipe 43 leading through a restrictor and valve system (described in detail below) to the space within a casing 44 which is connected to the low pressure pipe 40, and the pressure in chamber 30 is determined by the flow from chamber 28 through outlet 29, chamber 30, vent pipe 43 and the restrictor and valve system, and for a given restriction of the restrictor system, the pressure in chamber 30 is thus determined by the valve 31.

The valve 31 is loaded in the sense of opening by the setting spring 41 and by the load due to spring 37 which load is dependent on the position of the piston 20, and is loaded in the sense of closure by the pressure within chamber 33 acting on the head 34. Thus for each position of the ram piston 20 there is a corresponding value of the pressure in chamber 30.

The restrictor and valve system comprises a duct 50 leading from pipe 43 to an inlet 53 of a change-over valve 51 and containing a restrictor 52, the change-over valve 51 having two outlets 54, 55 to the interior of the casing 44. Outlet 54 contains a restrictor 56 and outlet 55 contains a restrictor 57 leading to a chamber 58 having outlets into the casing 44 controlled by coupled vent "starting" valves 59, and the change-over valve 51 operates to open one or the other of the outlets 54, 55.

The coupled valves 59 are operated by the "starting" control 24 which comprises a rigid diaphragm 60 separating two flexible capsules 61, 62 secured to a fixed wall 63 and the casing 44 respectively, the diaphragm 60 being linked to the valves 59. Capsules 61 and 62 are internally respectively at the pressure sensed by a reverse Pitot device 64 (FIGURES 2 and 3) and the pressure sensed by a reverse Pitot device 65.

The Pitot devices 64, 65 are mounted in the intake so that when the intake has "started" (FIGURE 3) they sense the pressures upstream and downstream of the shock wave 16, but that when the shock wave pattern is as shown in FIGURE 2 they both sense pressures downstream of the shock wave 16. Thus, when intake conditions are as indicated in FIGURE 2, the pressure in capsules 61, 62 are substantially equal and the valves 59 are closed, but when the intake has "started" as in FIGURE 3, the pressure in capsule 62 is substantially higher than that in capsule 61 (there being a pressure rise across the shock wave 16) and the valves 59 are fully open and offer no substantial restriction to flow from chamber 58.

The change-over valve 51 comprises a double piston valve element having two lands 66, 67 and normally fluid flowing into the valve 51 from inlet 53 flows between the lands 66, 67 to outlet 54, the valve member being urged towards the position shown by a spring 68. However, the right hand side of the piston valve is connected to the space between the lands 66, 67 by a duct 69 and the space to the left of the piston valve is open through port 70 to the low pressure space within the casing 44, so that as the pressure in chamber 30 rises with movement to the right of piston 20, the piston valve is subjected to an increasing load tending to move it to the left to close off outlet 54 and open outlet 55. As has been stated, the ram piston 20 moves to the right to adjust the ramps 12, 13 towards the wall 10, and thus as the intake throat area decreases, the piston valve 66, 67 moves to the left. It is arranged that at the preselected Mach No. at which the intake is to be "started," the valve 66, 67 has covered outlet 54 and opened outlet 55. Clearly if under these conditions, the coupled valves 59 are closed the pressure in the restrictor system and the chamber 30 will increase rapidly due to the restriction to flow caused by valves 59, but that if the valves 59 are open there will be no change in the pressure condition in chamber 30, the restrictors 56, 57 being matched.

In any case, the pressure in the restrictor system downstream of the restrictor 52 bears a given relationship to the pressure in chamber 30, which as stated represents the position of ram piston 20, and the pressure downstream of the restrictor 52 is used to produce a feed-back pressure in the air speed meter 22 controlling the ram piston 20, so that the ram piston is adjusted in accordance with Mach No.

For this purpose, a duct 71 leads from duct 50 downstream of restrictor 52 to one end of a balanced link valve 71a, the opposite end being open to a chamber 72 which is connected with duct 50 upstream of the restrictor 52 by a port 73 controlled by the link valve 71a. There is an outlet from chamber 72 through a duct 74 containing a restrictor 75, a conduit 76 and coupled valves 77 to the interior of casing 44 so permitting a flow of fluid from the duct 50 upstream of the restrictor 52 to the casing 44 in parallel with the flow through the restrictor system and change-over valve 51. The link valve 71a thus always takes up a position in which the pressure in chamber 72 equals that downstream of the restrictor 52, and thus bears a prescribed relationship to the pressure in chamber 30.

The duct 74 and restrictor 75 are formed in a differential area piston 78, the smaller area $a$ of which is subject to the pressure in chamber 72 and the larger area A of which is subjected to the pressure between the restrictor 75 and the valves 77. In the balanced condition of the piston 78 therefore, the pressure downstream of the restrictor 75 equals the pressure in chamber 72 multiplied by the factor $a/A$, and thus bears a predetermined relation to the pressure in chamber 30.

The space 21b of the ram cylinder 21 has an outlet pipe 79 leading to a chamber 80 which has an outlet into casing 44 controlled by coupled valves 81. These valves are connected to one end of a lever 82 which is pivoted at 83 and has connected to its other end a pair of capsules 84, 85 forming the air speed meter 22. The capsules 84, 85 are arranged so that as the flight Mach No. increases lever 82 is rocked to tend to close the valves 81. The lever 82 is loaded in the sense to open valves 81 by a tappet 86 carried by a feed-back piston 87 slidable in a cylinder 88 formed in one piece with the differential area piston 78, the underside of piston 87 being open to duct 74 downstream of the restrictor 75. The load applied by the tappet 86 therefore varies as the pressure in chamber 30 which pressures is representative of the ram piston position.

In operation, on increase of air speed the valves 81 are closed so causing an increase in pressure in cylinder space 21b and movement of the ram piston 20 to the right. This movement of the ram piston causes an appropriate increase in the pressure in chamber 30 and thus of the load applied by tappet 86 to the lever 82 so opening up the valves 81 until the pressure in space 21b falls to the value at which the loads on the ram piston 20 are balanced. Thus the ram piston position is dependent on the instantaneous Mach No. Conversely a decrease in air speed as sensed by the air speed meter 22 causes opening of the valves 81 and a fall in pressure in space 21b so that the loads on the ram piston 20 become unbalanced and it moves to the left. This movement of the ram piston 20 causes a corresponding decrease in the pressure in chamber 30 and consequently a fall in the pressure acting on the feed-back piston 87 and of the load applied by the tappet 86 to the lever 82 so that the valves 81 close until the pressure in space 21b rises to the value at which the loads on the ram piston again balance. It will be clear that under steady conditions the pressure in space 21b is the same for all positions of the ram piston 20, but that the pressure in chamber 30 is unique for each position of the ram piston 20.

As was stated above, the effect of the air speed meter 22 is varied by an altitude compensator 23 at altitudes above a selected altitude. The altitude compensator 23 has the effect that as the altitude increases a higher feed-back pressure is required to act on the feed-back piston 87 to secure balance of the loads on the lever 82, and thus, that for a given air-speed sensed by the air speed meter 22, the ramps 12, 13 are adjusted to reduce the effective throat area as the altitude increases.

The altitude compensator 23 comprises a pair of capsules 90, 91, separated by a rigid diaphragm 92, the capsule 90 being evacuated and capsule 91 being internally at ambient atmospheric pressure. The diaphragm 92 is connected by a stem 93 to a long lever 94 at a point close to one end of the lever, which end carries the valves 77 at the outlet of conduit 76. The opposite end of the lever 94 is pivoted to the differential area piston 78.

On decrease of atmospheric pressure, capsule 91 collapses and the lever 94 is rocked about its point of connection to the differential area piston 78 to open the valves 77 and cause a fall of pressure in the conduit 76. This fall of pressure unbalances the piston 78, which moves to the right so causing rocking of the lever 94 about its point of connection to the stem 93 and closing the valves 77 until the pressure in the conduit 76 is restored to the original value at which the loads on the piston 78 are balanced. The movement of the piston 78 causes the point of contact of the tappet 86 on lever 82 to move towards the pivot 83. The lever 82 thus becomes unbalanced and closes the valves 81 and the ram piston 20 moves to the right, so adjusting the ramps 12, 13 towards the wall 10, until the feed-back pressure acting on the feed-back piston 87 has increased sufficiently to restore the balance of lever 82.

At altitudes below the selected altitude, the differential area piston 78 is in a position in which the cylinder 88 is abutting a stop 95 and the valves 77 actuated by the altitude compensator 23 are closed beyond the extent necessary to secure balance of the piston 78. Therefore the hydraulic load applied on lever 82 by the tappet 86 is much higher than is necessary to secure balance of the lever 82 and the valves 81 are thus open to a greater extent than is necessary to secure balance of the loads on the ram piston 20 which is therefore at the left hand end of its travel and the ramps 12, 13 are fully retracted. It is unlikely that the air speed meter 22 will produce a moment on lever 82 sufficient to balance the moment on lever 82 due to tappet 86 since the aircraft is unlikely to reach a sufficiently high Mach No. in flight below the selected altitude. It is not expected that a supersonic aircraft will be required to achieve a speed of Mach 2 below the selected altitude, or alternatively that the intake will be required to operate efficiently below this altitude.

In operation, assuming level flight at above the selected altitude, as the aircraft speed increases towards a determined Mach No. in supersonic flight, the ram piston 20 is moved to the right reducing the effective throat area of the intake and simultaneously, the piston valve 66, 67 of the change-over valve is subjected to an increasing load tending to move it to the left. At a value of this pressure (which as explained above is dependent on the position of ram piston 20 and thus of Mach No.) corresponding to the Mach No. at which the intake is to be "started," the discharge from the change-over valve is changed from outlet 54 to outlet 55, the ramps 12, 13 having been adjusted to the position of FIGURE 2. Now under these conditions, the pressures sensed by the starting control capsules 61, 62 are such that the valves 59 in the outlet are closed. Thus there is a marked increase in the pressure downstream of restrictor 52, in the pressure in chamber 72 and in the feed-back pressure acting on piston 87 so causing the ram piston 20 to move to the left and to retract the ramps 12, 13 to the position of FIGURE 3 and to allow the shock wave pattern to take up the desired configuration. As soon as this configuration is achieved, the "starting" control 24 operates to fully open valves 59 and the restriction to flow of outlet 55 is now determined by restrictor 57. The feed-back pressure acting on the feed-back piston 87 thus falls and the ram piston 20 moves to the right to restore the ramps 12, 13 to the position (FIGURE 4) determined by the air speed meter 22.

A modified form of the change-over valve 51 is illustrated in FIGURE 6. As in the arrangement of FIGURE 5, the change-over valve has a piston valve member which is loaded to move to the right by a spring 68, which is loaded by movement to the left by hydraulic pressure downstream of the restrictor 52, and which comprises a pair of spaced lands 166, 167 co-operating respectively with outlets 55, 54.

The land 167 is, however, of a smaller diameter than the land 166, and the valve casing is formed internally with an axially-extending annular flange 170 against which the land 166 is held by the spring when the pressure in the duct 50 downstream of the restrictor 52 is insufficient to compress the spring. The flange 170 forms with the portion of the casing surrounding it an annular channel 171 which is cut off from the space 172 into which duct 50 opens, whilst the land 166 is held against the flange 170. However, as soon as the lands 166 move away from the flange 170 channel 171 is placed in communication with the space 172. The channel 171 is connected by a duct 173 containing a fine restrictor 174 to the space housing the spring 68 and thus to the low pressure region within the casing 44.

Whilst the pressure downstream of the restrictor 52 is relatively low, the effective area of the piston which is subjected to an hydraulic load tending to move it to the left against the action of spring 68 is equal to the area of the right-hand face of the land 167, the pressure acting on this face being the same as that in space 172 by reason of the duct 69. As soon as the pressure acting on the right hand face of land 167 becomes sufficiently high to overcome the effect of spring 68, the land 166 moves away from the flange 170 so that the channel 171 is placed in communication with the space 172. Consequently the hydraulic load on the piston valve member tending to move it to the left rapidly increases and the piston valve member is moved rapidly to the left closing off the outlet 54 (which is in communication with space 172 when land 166 is against the flange 170) and opening up outlet 55 which is covered by the land 166 when it is against the flange 170. In other words, the piston valve member moves with a snap action once the pressure in the space 172 becomes sufficiently high to cause the land 166 to move away from the flange 170.

The duct 173 and restrictor 174 act to keep the pressure within the channel 171 low whilst the land 166 is against the flange 170 by preventing any build-up of pressure in the channel due to leakage of pressure fluid past the flange 170. Also the duct 173 and restrictor 174 act to prevent excessive build-up of pressure in the hydraulic system upstream of the change-over valve under conditions in which flow through outlet 55 is prevented by complete closure of the valves 59.

The load of spring 68 on the piston valve member will be selected so that it is overcome when the aircraft Mach No. reaches the value at which it is desired to "start" the intake.

Referring now to FIGURE 7, there is shown another form of control according to this invention. The intake as before comprises fixed walls 10, 11, 12 and adjustable ramps 12, 13 and the ramps 12, 13 are connected by links 210 to one arm of a bell crank 211, the other arm of which is connected, to be rocked, to the rod 220a of a differential area ram piston 220 slidable in a ram cylinder 221. On movement to the right of the piston 220, the angle of the ramps 12, 13 is increased so decreasing the intake throat area, and on movement to the left of piston 220, the intake throat area is increased by reduction of the ramp inclination.

One cylinder space 221a of cylinder 221 is connected by pipe 222 to a source of high pressure fluid and the other cylinder space 221b, which faces the larger area side of piston 220, is connected by pipe 223 to the high pressure pipe 222 via a kinetic valve which controls the pressure in space 221b. The kinetic valve comprises a pair of aligned ports 222a, 223a, between which an obturator blade 224 is interposed. A stream of high pressure fluid is directed from port 222a toward port 223a and the pressure in space 221b depends upon the extent to which the blade 224 intercepts the stream; as the blade 224 moves clear of the stream so the pressure in space 221b increases and as the blade moves more across the stream, the pressure decreases.

The blade 224 is carried by a pivoted lever 225 which is loaded by a push rod 226 through piston 227 which is subjected to a pressure (the feedback pressure) in pipe 228 representing the piston position (and thus the setting of the ramps 12, 13), and by a push rod 229 through piston 230 which is subjected to a control pressure in pipe 231, the derivation of which will be described below.

Due to these loads the blade 224 tends to take up a position in which the hydraulic loads on the piston 220 are balanced. If for any reason the load applied through tappet 229 changes, the blade 224 moves so causing a change in pressure in space 221b to move the piston 220 which movement causes a corresponding change in the load applied through tappet 226 to move the blade back to the position in which the loads on piston 220 are balanced. Thus for each value of pressure in pipe 231, there is a unique position of the piston 220.

The pipe 228 is connected to high pressure pipe 222 through a restrictor 232 and has a bleed outlet 233 leading from it downstream of the restrictor 232. The bleed outlet 233 is controlled by a valve 234 carried by a lever 235 and thus, as the valve 235 opens, the pressure in pipe 228 falls, there being a flow through the restrictor 232 and valve 234 to low pressure pipe 236, and as the valve 235 closes the pressure in pipe 228 rises. The lever 235 is loaded in the sense of opening valve 234 by a piston tappet 237, which is loaded by the pressure in pipe 228, and in the sense of closure by spring 239 which has an adjustable abutment 240 varied by a cam 241. The cam 241 is connected as indicated at 241a to the bell-crank 211 so that it is rotated as the bell crank is rocked and so that it has a position determined by the position of piston 220 in cylinder 221. The shape of cam 241 such that the load due to the spring 239 is a unique value for each position of the piston 220 in cylinder 221 and it is arranged that as piston 220 moves to the right to reduce the throat area of the intake, the spring load is gradually increased.

The pressure in pipe 231 is derived from the control mechanism (a) to be varied with Mach No. (b) to be varied by altitude changes above a selected altitude and (c) to give a false Mach No. indication when the conditions at the intake are suitable for "starting" the intake.

The Mach No. control is effected by an air speed meter comprising a pair of flexible capsules 242, 243 which are internally at ambient static atmospheric pressure and at velocity head pressure respectively and which act in opposition on a saddle 244 which is pivoted to a lever 245 varying a valve 246 controlling a bleed outlet 247a from a pressure space 247 which is connected to high pressure pipe 222 through a restrictor 248. As the air speed increases so capsule 243 expands tending to rock lever 245 to close the valve 246.

The lever 245 is also loaded by a tappet 249 on a feedback piston 250 which is slidable in a differential area piston 251, the smaller area of which is exposed to space 247 and the larger area of which is exposed to a space 252. The piston 251 is slidable in a cylinder 253 in a direction at right angles to the piston 250 so that, as piston 251 moves, the length of the lever arm by which the piston 250 acts on lever 245 changes.

The spaces 247 and 252 are interconnected by a duct 254 containing a restrictor 255 and the underside of the piston 250 is open to the duct 254 downstream of the restrictor 255 so that it is loaded by the pressure in the space 252. The space 252 has an outlet 252a which is controlled by a valve 256.

The valve 256 is carried by a floating beam 257 which has a nose 257a at one end engaging a ramp 251a on the piston 251 and which is otherwise supported by knife edges 258a, 259a on a pair of pivoted arms 258, 259, the pivots for which are adjustable as indicated at 260. The arm 258 is loaded by a pair of flexible capsules 261, 262 of which capsule 261 is evacuated and capsule 262 is at static ambient atmospheric pressure ($p_o$) and the capsules bear on a saddle 263 carrying a knife edge 263a which engages arm 259. As altitude increases, pressure ($p_o$) decreases causing a decrease in the load applied through arm 259 and knife-edges 259a, 258a to the beam 257. The knife-edge 258a transmits to the beam 257 a load exerted by a spring 264 which acts on arm 258 through knife-edge 264a. The arms 258, 259 allow adjustment of the loads applied to the beam 257 by the spring 264 and the capsules 261, 262 and reduces the need for very high accuracy in the manufacture of these parts to ensure substantial uniformity of their spring rates as between one sample of the part and another sample; this is of particular importance in relation to springs as uniformity of spring rate in a batch is difficult to achieve.

It will be appreciated that at constant atmospheric static pressure ($po$), the parts 256 to 264 will be in equilibrium, the valve 256 having a constant restriction. Therefore the pressure in space 252 will bear a fixed ratio to the pressure in space 247 so that tappet 249 will apply to the lever 245 a load bearing a predetermined relation to the pressure in space 247.

On change of airspeed, say on increase of airspeed, the lever 245 will be rocked by expansion of capsule 243 to close valve 246 so tending to unbalance the lever, but closure of valve 246 will cause corresponding rises in the pressures in spaces 247 and 252 so causing the load applied by piston 250 to lever 245 to increase to maintain the lever 245 in balance. Thus the pressures in spaces 247 and 252 will have a unique value for each airspeed at any particular value of atmospheric pressure ($po$).

Assuming now there is a change, say an increase, of altitude at constant air speed. This change will cause a decrease of the load applied by capsules 261, 262 to the beam 257 so allowing valve 256 to open and causing an increase in flow through it and a decrease in the pressure in space 252 so unbalancing the piston 251 which in this case will move to the right. The nose 257a runs along the ramp 251a so closing the valve 256 and increasing the pressure in space 252 again until the loads on the piston 251 are again balanced; this will occur when valve 256 is restored to its original position, and the spring load on beam 257 has decreased correspondingly to the decrease in ambient atmospheric pressure ($po$).

As a result the piston 251 has a unique position in cylinder 253 for each altitude above a selected altitude determined by the nose 257a reaching the right-hand limit of the ramp 251a when piston 251 comes against abutment 253a.

Movement of the piston 251 on increase of altitude alters the point of contact of tappet 249 on lever 245 to the right to reduce the moment arm of the force applied by tappet 249, thus requiring an increase in pressure in the spaces 247 and 252 to balance the loads on lever 245. In other words, at any particular value of air speed or Mach No. the pressure in space 247 has a unique value for any value of ($po$) below a value corresponding to the selected altitude.

The air speed and altitude responsive pressure in space 247 is used to derive the pressure in pipe 231.

The space 247 is connected by duct 270 to a space 271 at one end of a throttle valve 272, the opposite end of which is loaded by a spring 273 having an adjustable abutment 274 and rate adjustment means 275.

The throttle 272 is hollow and has a shaped orifice 272a which on movement of the throttle 272 moves past a narrow channel 276 fed with high pressure fluid from pipe 222 via a restrictor 277. The throttle 272 has an outlet through duct 278 controlled by valve 279 supported by an arrangement which ensures that the pressure drop across orifice 272a is constant. Clearly the position of the throttle 272 depends on the pressure in space 247 and thus since the pressure drop across orifice 272a is constant, the flow through the orifice will be determined in accordance with air speed and altitude and by the shape of the orifice 272a.

The valve 279 is carried by a rod 280 formed with a piston 281 which works in a cylinder 282 against a spring 283, the cylinder 282 being carried by a rod 284 loaded by a spring 285 which acts to tend to open the valve 279. The piston and cylinder assembly 281, 282 is loaded hydraulically by the pressure upstream of orifice 272a through duct connection 286 in the sense to close valve 279 and hydraulically in the opposite sense through duct 287 by the pressure downstream of orifice 272a. Thus the valve 279 will always be adjusted so that the difference in these pressures is determined by spring 285.

The outflow through valve 279 passes by duct 288 and restrictor 289 to low pressure pipe 236. Since the flow through the throttle orifice 272a is dependent on air speed and altitude and the shape of the orifice, the pressure drop across restrictor 289 will be correspondingly dependent on these factors.

The pipe 231 is connected to duct 288 upstream of restrictor 289 so that the load applied to the lever 225 through tappet 229 is likewise dependent on air speed, altitude and the shape of orifice 272a. This load as has been said above determines the position of the ram piston 220 and the setting of the ramps 12, 13.

For instance by suitably shaping the orifice 272a a ramp angle/Mach No. characteristic A as illustrated in FIGURE 8 may be obtained. Such characteristic may be required to secure efficient intake operation over a wide range of Mach No.

In order to "start" the intake, that is to reach the setting shown in FIGURE 3, the following mechanism is adopted. A bleed 290 is taken from pipe 231 under control of a starting valve 291 which is carried by a lever 292. The lever 292 is operated by starting capsules 293, 294 of which capsule 293 is connected to Pitot device 64 and capsule 294 is connected to Pitot device 65. The capsules load a stirrup 295 which is pivoted to lever 292. The lever 292 is loaded in the sense of closing valve 291 by a lock spring 296 acting on a plunger 297 which is also acted on against spring 296 by the hydraulic pressure in space 247 which is communicated to plunger through duct 298.

The spring 296 holds valve 291 fully closed and as the air speed increases, the hydraulic load on plunger 297 gradually increases until it overcomes the spring 296. This condition is arranged to occur at the "starting" Mach No. The lever 292 is now unlocked.

If the shock wave formation is as shown in FIGURE 2, the pressures in capsules 293, 294 are substantially equal and valve 291 opens so causing a rapid reduction in the pressure in pipe 231 thus causing instantaneous collapse of the ram 220, 221 and increase of the intake area as indicated by the dotted trace B in FIGURE 8 allowing the intake to "start." Once the shock wave formation of FIGURE 3 is obtained, the pressure in capsule 294 becomes substantially higher than that in capsule 293 so moving lever 292 to close the valve 291 completely and allowing the air speed, altitude and orifice 272a to resume control causing decrease of the intake area as indicated by trace C.

We claim:
1. A supersonic air intake for aircraft comprising
   (a) a first wall means having at its upstream end an intake lip,
   (b) second wall means spaced from said first wall means and extending upstream and downstream from said lip,
   (c) said wall means having a configuration to form at least one air passage which has a throat downstream of said lip and in which in supersonic flight, at speeds exceeding a value of Mach No. greater than 1 a shock pattern develops including both internal shocks and external shocks,
   (d) said second wall means including wall members adjustable towards and away from the first wall means to vary the effective area of the throat, and
   (e) control means controlling adjustment of the wall members and comprising
      ($e_1$) an air-speed meter responsive to air-speed and controlling adjustment of the wall members in a manner to vary the throat area in accordance with changes of air-speed, and ($e_2$) a starting control responsive to said value of Mach No., said starting control at said value overriding the air-speed meter and effecting a temporary adjustment of the wall members in the sense to increase the throat area.

2. A supersonic air intake according to claim 1, said starting control also comprising means sensing the position of one of said internal shocks in said passage and rendering the starting control inoperative to override the air-speed meter when said one of the internal shocks moves to a predetermined position in said passage.

3. An internal compression supersonic air intake according to claim 2, wherein the adjustable wall members consist of a pair of oppositely inclined ramps pivotally supported to swing towards and away from the first wall means to vary the throat area, and the control means includes a ram connected to effect swinging of the ramps, the ram being controlled by the air-speed meter and having a unique setting for each Mach No. in a range of Mach Nos., which range includes said value, and being controlled by the starting control at said value of Mach No. to effect temporary swinging of the ramps away from the first wall means.

4. An internal compression supersonic air intake according to claim 3, comprising means actuated by the ram and producing a feed-back pressure representative of the instantaneous setting of the ram and thus of the throat area, a valve loaded by said feed-back pressure, said valve controlling the balance of loads acting in the ram, the air-speed meter loading the valve in opposition to the feed-back pressure so that for each value of the air speed there is a corresponding feed-back pressure at which the loads acting in the ram are balanced, the starting control varying one of the pressures acting on the valve in a manner to cause the desired starting adjustment of the ramps.

5. An internal compression supersonic air intake according to claim 4, comprising also means responsive to air speed to render the starting control operative at the said value of Mach No. and rendering the starting control inoperative at airspeed values below the said value of Mach No.

6. An internal compression supersonic air intake according to claim 1, said starting control comprising a pair of reversed Pitot devices located at positions in the intake so that before the intake has started they sense substantially the same pressure and after the intake has started they sense the pressures upstream and downstream of said one of the internal shocks, and a pair of opposed pressure-responsive devices, the reversed Pitot devices feeding the sensed pressures to the opposed pressure-responsive devices, said opposed pressure-responsive devices being connected to override the air-speed meter and effecting said temporary adjustment of the wall members.

7. An internal compression supersonic air intake according to claim 1, the control means including an altitude compensator rendering the control means inoperative below a selected altitude of flight and adjusting the control means above the selected altitude to compensate for variations in altitude.

8. An internal compression supersonic air intake according to claim 7, the altitude compensator causing full retraction of the wall members away from the first wall means at altitudes below the selected altitude and varying the effect of the air-speed meter on the ram position as the altitude of flight varies above the selected altitude.

9. An internal compression supersonic air intake according to claim 1, said control means comprising a ram having a cylinder and a differential area ram piston dividing the cylinder into first and second pressure spaces on the smaller and larger area sides of the ram piston, the piston being connected to move the adjustable walls, wall members, a restrictor, a source of pressure fluid connected to the first pressure space and through said restrictor to the second pressure space, an outlet from the second pressure space, a first valve controlling flow through the outlet, said airspeed meter loading the first valve in the sense to cause movement of the ram piston to decrease the throat area as air speed increases, feedback means producing a feed back pressure signal representing the position of the ram piston in its cylinder and loading the first valve opposition to the air speed meter, whereby for each value of air speed there is a corresponding feed back pressure signal and a corresponding setting of the ram piston, and an altitude compensator varying the feed-back pressure signal in the sense to cause a decrease of throat area as altitude increases, said starting control being sensitive to the shock wave pattern in the intake passage and including change-over means responsive to air speed and rendering the starting control operative at the said value of Mach No., said starting control being connected to the feed-back means and causing a temporary change in the feed-back pressure signal in the sense to cause a temporary increase in the throat area to effect "starting" and thereafter to restore the throat area to a setting appropriate to operation at the selected Mach No.

10. An internal compression supersonic air intake according to claim 9, wherein the feed back means comprises a fluid flow path, and the starting control comprises a pair of matched restrictors connected as parallel outlets from said flow path, a starting valve in series with one of the matched restrictors, pressure-responsive means sensitive to pressures in the intake passage created by said shock pattern and connected to close the starting valve before starting of the intake and to open the valve after starting of the intake, and said change-over means includes a valve movable as the feed back pressure signal varies with increase of air speed, said valve maintaining closed the outlet through said one of the restrictors until the said value of the Mach No. is reached and then closing the outlet through the other of said matched restrictors and opening the outlet through said one of the restrictors.

11. An internal compression supersonic air intake according to claim 10, the said fluid flow path including a feed-back pressure valve loaded in one sense by the feed back pressure, there being means actuated by the ram piston subjecting the feed-back pressure valve in the opposite sense to a load determined by the ram piston position, and a scheduling restrictor in series with the feed-back pressure valve, the feed-back pressure signal being derived from the flow path between the feed-back pressure valve and the scheduling restrictor.

12. An internal compression supersonic air intake according to claim 11, comprising a lever, the first valve and airspeed meter being connected to opposite ends of the lever, a feed-back piston subjected to a pressure determined by the feed pressure signal, said feed-back piston engaging the lever between its ends and loading the lever in opposition to the air-speed meter, the feed-back piston being moved by the altitude compensator to vary the point of application of the load by feed-back piston on the lever.

13. An internal compression supersonic air intake according to claim 12, comprising a differential-area piston slidable substantially parallel to the lever, the feed-back piston being mounted in said differential area piston to slide in a direction at right angles to the direction of movement of the differential area piston, a first pressure space connected to the fluid flow path upstream of the scheduling restrictor, the smaller area side of the differential area piston being open to said first pressure space, a further pressure space connected by a restrictor to the first pressure space and having an outlet, the larger area side of said differential area piston being open to said further pressure space, an altitude responsive valve controlling said outlet, the altitude responsive valve also being linked to be adjusted by movement of the differential area piston so that this piston takes up a position in dependence upon altitude, and the feed-back piston being subjected to the pressure in said further pressure space.

14. An internal compression supersonic air intake according to claim 13, comprising a pressure-balanced link valve connecting said first pressure space to the fluid path upstream of the scheduling restrictor, said link valve maintaining the pressure in the first pressure space equal to the pressure in the fluid path just downstream of the scheduling restrictor.

15. An internal compression supersonic air intake according to claim 1, the control means comprising a ram cylinder, a differential area ram piston dividing the cylinder into first and second pressure spaces on the smaller and larger area sides respectively of the ram piston, the ram piston being connected to adjust the adjustable wall members to vary the throat area, a pressure fluid source connected to the first cylinder space, a pressure control valve controlling the supply of pressure fluid from the source to the second pressure space, first signal means actuated by the air speed meter and producing a pressure signal representative of air speed, an altitude compensator varying the pressure signal on change of altitude in the sense that an increase of altitude has the same effect as an increase of airspeed, and second signal means actuated by the ram piston and producing a feed-back pressure signal representing the position of the ram piston in the cylinder, said pressure control valve being connected to the first signal means and the second signal means to be loaded by the feed back pressure signal in opposition to a load determined by the altitude compensated airspeed pressure signal, said starting control being responsive to the shock wave pattern in the intake and at the said value of the Mach. No. causing a temporary change in the load due to the airspeed pressure signal in the sense to cause a temporary increase of the throat area.

16. An internal compression supersonic air intake according to claim 15, wherein the starting control includes a starting valve which when actuated varies the load due to the airspeed pressure signal in the sense to increase the throat area to start the intake and thereafter to decrease the throat area, and a lock mechanism responsive to air speed and acting on the starting valve to prevent actuation thereof until the said value of Mach No. is reached.

17. An internal compression supersonic air intake according to claim 16, wherein the starting valve opens to cause the increase in throat area to start the intake, and the lock mechanism includes a plunger, a spring loading the plunger onto the starting valve to maintain it closed, and means subjecting the plunger in opposition to the spring to a fluid pressure load which increases as airspeed increases.

18. An internal compression supersonic air intake according to claim 15, said first signal means comprising a first fluid flow path having in flow series in it first and second restrictors and an altitude responsive valve, a bleed from between the first and second restrictors, a bleed valve controlling flow through the bleed, the bleed valve being loaded in opposition to one another by the airspeed meter and by a pressure determined by the pressure between the first and second restrictors.

19. An internal compression supersonic air intake according to claim 18, said first signal means further comprising a lever, the bleed valve and the airspeed meter being connected to the lever at the ends thereof, a feed-back piston subjected to the pressure in the flow path between the altitude responsive valve and the second restrictor, the feed-back piston acting on the lever between its ends and in opposition to the air-speed meter, a differential area piston sliding in a direction substantially parallel to the lever, said feed-back piston being slidably mounted in the said differential area piston to slide at right angles to said direction, thereby to vary the point of action of the feed back piston on the lever, the differential area piston being loaded on its smaller side by the pressure between the first and second restrictors and on its larger side by the pressure between the second restrictor and the altitude responsive valve, and the altitude responsive valve being adjusted in accordance with altitude and in accordance with the movement of the differential area piston in the sense to maintain the loads acting on the differential area piston balanced.

20. An internal compression supersonic air intake according to claim 18 said first signal means comprising a further fluid flow path, a throttle valve in said further fluid flow path, a spring loading the throttle valve, the altitude compensated airspeed pressure signal being applied to the throttle valve to adjust it against the action of the spring to vary the orifice area of the throttle valve in accordance with a desired relationship between Mach No. and the throat area, means maintaining the pressure drop across the throttle valve constant, whereby the flow through the further flow path is controlled to be dependent on the orifice area of the throttle valve and thus varies with Mach No. in accordance with the desired relationship, the further flow path also including a restrictor arrangement receiving the controlled flow and producing the altitude-compensated air speed pressure signal which is applied to the pressure control valve of the ram.

21. An internal compression supersonic air intake according to claim 16, wherein the starting control comprises a pair of reversed Pitot devices located at positions in the intake so that before the intake has started they sense substantially the same pressure and after the intake has started they sense the pressures upstream and downstream of said one of the internal shocks, a pair of opposed pressure responsive devices, the reversed Pitot devices feeding the sensed pressures to the opposed pressure responsive devices which are connected to actuate the starting valve.

References Cited in the file of this patent

UNITED STATES PATENTS

| | | |
|---|---|---|
| 2,934,288 | MacIntyre | Apr. 26, 1960 |
| 2,997,843 | Arnett et al. | Aug. 29, 1961 |

FOREIGN PATENTS

| | | |
|---|---|---|
| 166,124 | Australia | May 29, 1958 |
| 225,670 | Australia | Dec. 4, 1959 |